United States Patent [19]

Chigira et al.

[11] Patent Number: 5,197,537
[45] Date of Patent: Mar. 30, 1993

[54] APPARATUS FOR CONTROLLING TEMPERATURE OF MACHINE TOOL

[75] Inventors: Junji Chigira; Koichi Urano, both of Maebashi, Japan

[73] Assignee: Kanto Seiki Co., Ltd., Gunma, Japan

[21] Appl. No.: 423,469

[22] PCT Filed: Jun. 1, 1989

[86] PCT No.: PCT/JP89/00553

§ 371 Date: Oct. 2, 1990

§ 102(e) Date: Oct. 2, 1990

[87] PCT Pub. No.: WO89/12527

PCT Pub. Date: Dec. 28, 1989

[30] Foreign Application Priority Data

Jun. 20, 1988 [JP] Japan ............... 63-150054

[51] Int. Cl.⁵ .................. F28F 27/00; B23Q 11/14
[52] U.S. Cl. ...................... 165/32; 165/47;
236/78 B; 236/91 F; 62/210; 62/201; 62/211;
62/434; 62/435; 62/DIG. 10
[58] Field of Search ............... 62/DIG. 10, 435, 201,
62/210, 209, 211, 434; 236/78 B, 91 F; 165/26,
28, 48.1, 47, 32

[56] References Cited

U.S. PATENT DOCUMENTS

| | | | |
|---|---|---|---|
| 2,606,747 | 8/1952 | Williams | 62/DIG. 10 |
| 3,066,578 | 12/1962 | Olton | 165/48.1 |
| 3,315,892 | 4/1967 | Hoake | 236/78 B |
| 3,480,076 | 11/1969 | Tomita | 165/28 |
| 3,581,986 | 6/1971 | Magri | 236/78 B |
| 3,772,896 | 11/1973 | Rao | 62/435 |
| 3,859,812 | 1/1975 | Panlak | 62/DIG. 10 |
| 4,719,830 | 1/1988 | Kawada et al. | 62/DIG. 10 |
| 4,922,996 | 5/1990 | Rees | 62/DIG. 10 |

FOREIGN PATENT DOCUMENTS 62-44351 2/1962 Japan .
63-66781 5/1988 Japan .

Primary Examiner—John K. Ford
Attorney, Agent, or Firm—Armstrong, Nikaido, Marmelstein, Kubovcik & Murray

[57] ABSTRACT

A temperature control apparatus for a machine tool includes four temperature sensors for detecting a reference temperature, outlet temperature of heat transfer fluid at an outlet of a heat exchanger, and temperatures of the heat transfer fluid at both inlet and an outlet of a machine tool element having a heat generating source. The four temperature sensors are arranged to constitute a differential temperature detecting means that activates control means to control temperature of the heat transfer fluid from the heat exchanger so as to minimize both deviations of heat transfer fluid temperature and steady-state deviations of machine tool body temperature.

4 Claims, 3 Drawing Sheets

APPARATUS FOR CONTROLLING TEMPERATURE OF MACHINE TOOL

DESCRIPTION

1. Technical Field

The present invention relates to a method of and apparatus for controlling the temperature of a machine tool. More particularly, the present invention relates to a method of controlling the temperature of the body of a machine tool which enables a reduction in the size of the transient deviation and steady-state deviation and also pertains to an apparatus for carrying out the temperature control method.

2. Background Art

The body of a machine tool is deformed by the environmental temperature, heat from a heat generating portion, etc. The deformation of the machine body affects the machining accuracy and therefore it has heretofore been general practice to control the temperature of each part of the machine body to be a constant temperature. Although a variety of temperature control methods for this purpose have been proposed, an indirect control method wherein a temperature-controlled fluid is arranged to flow through a heat generating portion of a machine tool to thereby cool the heat generating portion is generally carried out. The set temperature for the fluid is controlled so as to follow up the room temperature or the temperature of one of the constituent elements that has the largest time constant. This method minimizes the thermal deformation and reduces machining errors. This is a known art, and these methods are called the room temperature follow-up control or the machine body temperature follow-up control.

Hitherto, two position control has been employed as a control action used when the indirect control of a machine tool by the fluid temperature is effected by the room temperature follow up control or the machine body temperature follow-up control. In the case of two-position control, the temperature fluctuation range $\sigma(k)$ of the fluid temperature controlled may be expressed as follows:

$$\sigma = (QR/Kr)\{1 - exp(-L/T) + \Delta exp(-L/T)\} \quad (1)$$

wherein QR: the cooling capacity (Kcal/h) of the temperature control apparatus; Kr: the coefficient of heat dissipation (Kcal/h.°C.); $\Delta$: the differential gap (°C.) of the two-position (ON-OFF action) temperature controller; L: the dead time (h) from the time when the control action is initiated to the time when a temperature change is detected with a temperature detector (sensor); T: the time constant (h) of an object of temperature control; $\gamma$: the load factor (the ratio of the quantity of heat generated to the cooling capacity); and exp: natural logarithm.

In two-position control, the steady-state deviation $\Delta\theta_0$ of the control variable (controlled fluid temperature) that may be expressed by the following equation is produced:

$$\Delta\theta_0 = (\gamma - 0.5)(QR/Kr)\{1 - exp(-L/T)\} \quad (2)$$

Both the temperature fluctuation range $\sigma$ and the steady-state deviation $\Delta\theta_0$ increase as QR increases. As the quantity of heat generated in the machine tool increases, QR is increased, as a matter of course. Therefore, in recent machine tools in which a large quantity of heat is generated, the temperature fluctuation range $\sigma$ and the steady-state deviation $\Delta\theta_0$ may exceed the allowable values.

If PID control which includes an integral control action is employed, the steady-state deviation $\Delta\theta_0$ becomes 0, but the PID control has the problem that, if detection is not carried out at a point where the dead time is minimized (i.e., at the outlet of the heat exchanger in the case of the temperature control of a machine tool), the transient deviation of the control variable increases and the settling time becomes longer. Indirect control in which the fluid temperature at the outlet of the heat exchanger is detected to effect control, however, leads to the steady-state deviation $\Delta\theta w_1$(°C.) of the machine body (i.e., the difference between the temperature of the machine wall temperature and the temperature of the heat transfer fluid) expressed by the following equation:

$$\Delta\theta w_1 = Q/(\alpha F) + Q/(2W) \quad (3)$$

wherein Q: the heat load (kcal/h) transferred from the machine wall to the heat transfer fluid; $\alpha$: the mean heat transfer coefficient (kcal/m²h°C.) between the machine wall and the heat transfer fluid; F: the heat exchanging surface area (m²); and W: the water equivalent of the heat transfer fluid, i.e., the product (kcal/h°C.) of the volumetric rate of flow, density and specific heat of the fluid.

If the fluid temperature at the outlet of the machine tool is detected to effect control, the steady-state deviation $\Delta\theta w_2$(°C.) of the machine body is as follows:

$$\Delta\theta w_2 = Q/(\alpha F) - Q/(2W) \quad (3)$$

In other words, the steady-state deviation of the machine wall is Q/W(°C.) smaller than in the case where the fluid temperature at the outlet of the heat exchanger is detected to effect control. This may be said that the thermal deformation of the machine tool is minimized and machining errors are reduced.

With all the above-described factors taken into consideration, it is found that PID control is superior to ON OFF control in that the steady-state deviation of the fluid temperature is 0, but the conventional PID control has the contradiction that if the transient deviation of the controlled fluid temperature is reduced, then the steady-state deviation of the machine body increases, whereas, if the steady-state deviation of the machine body is reduced, then the transient deviation of the controlled fluid temperature increases. The present invention solves the problems of the conventional indirect control that employs a two-position action and those of the conventional indirect control by PID control.

DISCLOSURE OF INVENTION

It is an object of the present invention to provide a method of and apparatus for controlling the temperature of a machine tool which are designed so that the steady-state deviation of the fluid temperature is made 0 (zero).

It is another object of the present invention to provide a method of and apparatus for controlling the temperature of a machine tool which are designed so that the steady-state deviation of the machine body is minimized.

It is still another object of the present invention to provide a method of and apparatus for controlling the temperature of a machine tool which are designed so that the transient deviation of the fluid temperature is minimized to shorten the settling time.

A principal subject matter to attain the above-described object is a temperature control method for a machine tool wherein a heat transfer fluid is brought into contact with a constituent element of a machine tool which generates heat, thereby indirectly controlling the temperature of the constituent element to a constant temperature, wherein the improvement comprises: bringing the heat transfer fluid into contact with the constituent element to effect heat exchange; cooling the heat transfer fluid after the heat exchange by means of a cooling medium; measuring the value of a rise in the sensible heat temperature of the heat transfer fluid after the cooling; and controlling the cooling temperature of the heat transfer fluid on the basis of the value of a rise in the sensible heat temperature.

The temperature resulting from the rise in the sensible heat temperature is preferably detected in the form of a differential temperature between the same and a reference temperature.

Another subject matter of the present invention is a temperature control apparatus for a machine tool by an indirect control system including a constituent element of a machine tool which has a heat generating source, a heat transfer fluid brought into contact with the constituent element to cool it and a heat exchanger for cooling the heat of the heat transfer fluid with a cooling medium, wherein the improvement comprises: a reference temperature sensor for detecting a reference temperature; a heat exchanger outlet temperature sensor for detecting the temperature of the heat transfer fluid at the outlet of the heat exchanger; a constituent element outlet temperature sensor for detecting the temperature of the heat transfer fluid at the outlet of the constituent element; differential temperature detecting means constituted by the reference temperature sensor, the heat exchanger outlet temperature sensor and the constituent element outlet temperature sensor; and control means activated in accordance with the value of an output signal from the differential temperature detecting means to control the temperature of the heat transfer fluid.

It is preferable to provide a constituent element inlet temperature sensor for detecting the inlet temperature of the heat transfer fluid at the constituent element. In addition, it is more effective that the differential temperature detecting means is a bridge circuit having all of the temperature sensors incorporated therein and the control means is constituted by a PID circuit which performs a proportional plus integral plus derivative action. More preferably, the time constant of the constituent element inlet temperature sensor is made greater than the time constant of the heat exchanger outlet temperature sensor.

BEST MODE FOR CARRYING OUT THE INVENTION

Figure 1:
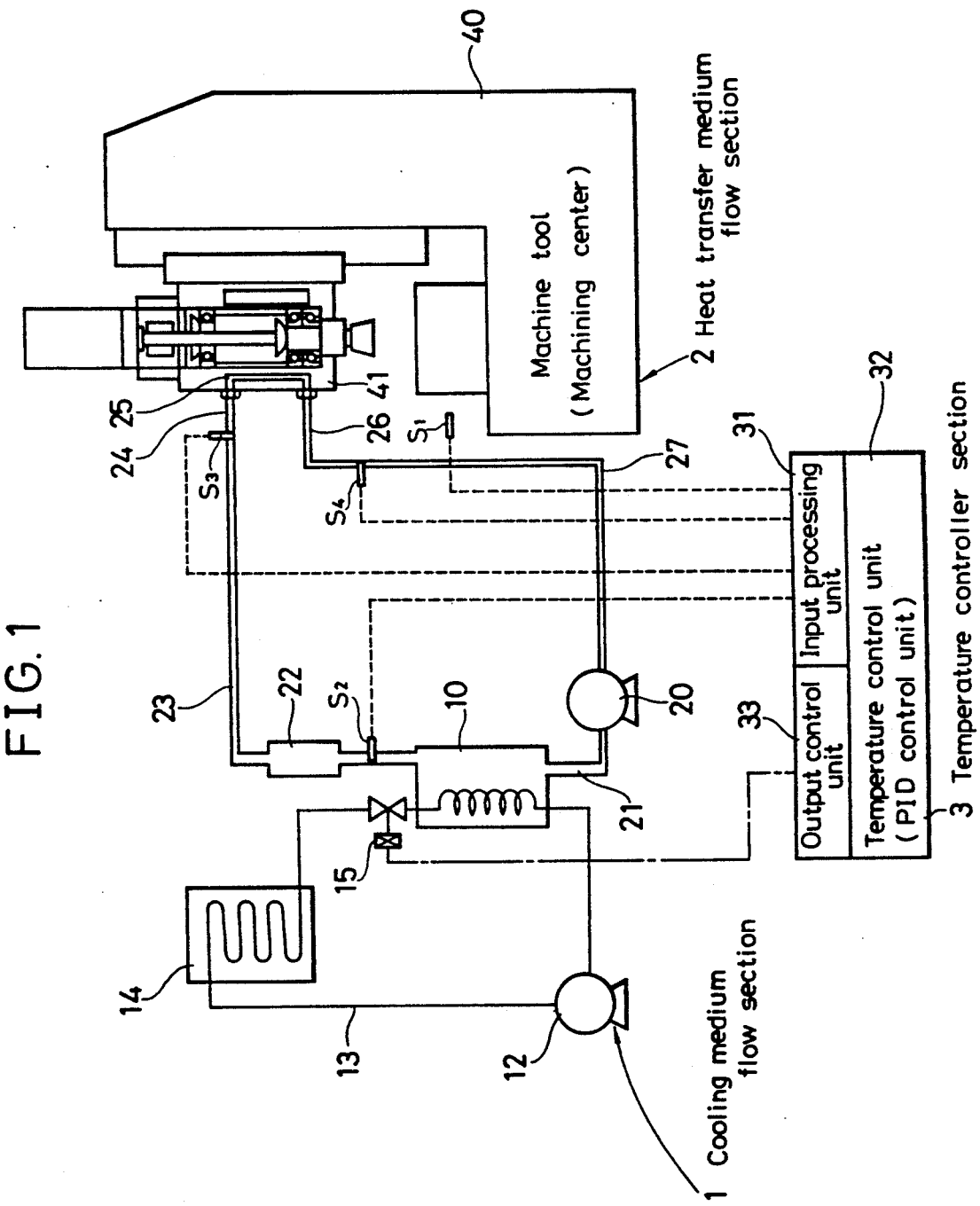
FIG. 1 is a system diagram showing one embodiment of the temperature control method and apparatus therefor according to the present invention.

A preferred embodiment of the present invention will be described below in detail with reference to the drawings. This embodiment controls a spindle head of a machine tool as a controlled system and employs oil as a heat transfer medium. FIG. 1 is a system diagram showing one example of a temperature control apparatus for a machine tool on which the temperature control method of the present invention is carried out. An outline of the arrangement of the temperature control apparatus will first be explained with reference to FIG. 1. The figure shows a temperature control apparatus for a spindle head 41 of a machining center 40. The temperature control apparatus generally comprises a cooling medium flow section 1, a heat transfer medium flow section 2 and a temperature controller section 3. As the heat transfer flow, oil (cooling oil) is employed, and as the cooling medium, a refrigerant (fluorocarbon) is employed.

The temperature controller section 3 directly controls the temperature of the heat transfer fluid by controlling the degree of opening of a solenoid-operated expansion valve 15 provided in a refrigerant passage 13 by proportional plus integral plus derivative action, i.e., PID action, in accordance with the quantity of heat generated (heat load) at the spindle head 41, thereby indirectly controlling the temperature of the spindle head 41. Each individual constituent section will next be described in detail. The heat transfer medium flow section 2 is arranged to pass cooling oil as being a heat transfer fluid through a jacket 25 provided inside the spindle head 41 so as to take away the heat generated at the spindle head 41 through heat exchange, thereby cooling the spindle head 41. The heat transfer medium flow section 2 comprises the following devices.

A heat exchanger (evaporator) 10 cools the cooling oil heated by taking away the heat generated at the spindle head 41. The cooling is effected by performing heat exchange between the heated cooling oil and the refrigerant flowing through the cooling medium passage 13, thereby cooling the oil to a set temperature. The heat transfer medium flow section 2 further comprises a cooling oil pump 20 for circulating the cooling oil, a damping tank 22 and cooling oil pipes 21, 23, 24, 26 and 27. The damping tank 22 is provided for the purpose of increasing the time constant of a sensor $S_3$ for detecting the oil temperature at the spindle head inlet for the reason described later. The time constant of the sensor $S_3$ may be made greater than that of a sensor $S_2$ by bringing the sensor $S_3$ into contact with the wall of the passage or by placing the sensor $S_3$ in a sheath having a proper time constant instead of providing the damping tank 22. Alternatively, a sensor which has a large time constant may also be employed.

To effect heat exchange between a machine tool and a heat transfer fluid, it is possible in the case of the spindle head 41 to employ a method wherein the jacket 25, which is a space, is provided as in the case of this embodiment or a method wherein cooling oil is showered on the inner wall surface of the spindle head 41 and this cooling oil is collected and discharged out of the spindle head 41.

The cooling medium passage 1 is the same as an ordinary refrigerating circuit. However, a solenoid-operated expansion valve 15 which is capable of automatically controlling the flow rate of the refrigerant by force is employed as a means that functions as an expansion valve or a capillary tube. The arrangement may also be such that a capillary tube is employed in place of the solenoid-operated expansion valve 15 and a solenoid-operated evaporation pressure control valve is provided at the outlet of the heat exchanger (evaporator) 10 to control the flow rate of the refrigerant.

Figure 2:
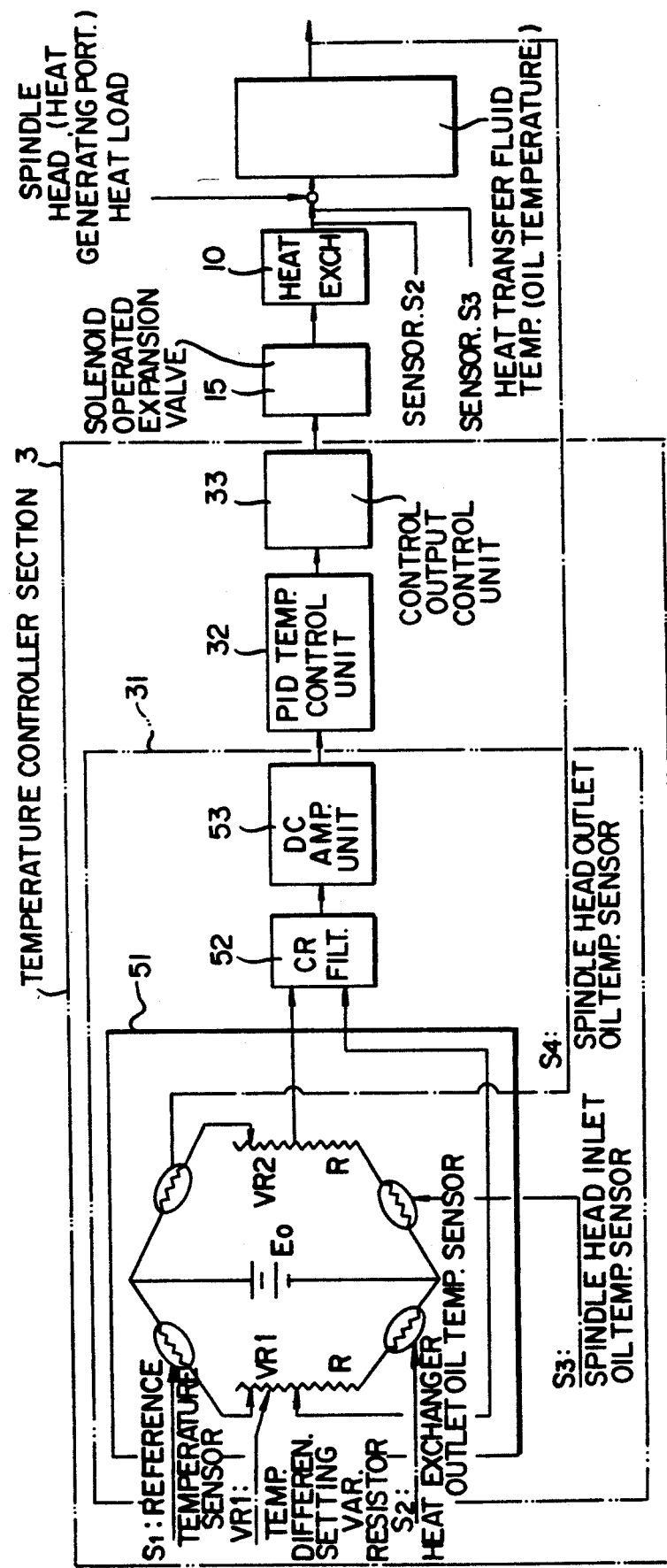
FIG. 2 is a system diagram showing in detail the functions of the temperature controller section.

Next, the temperature controller section 3 has four sensors $S_1$ to $S_4$ which are disposed as temperature detectors for detecting a reference temperature $\theta_1$ (room temperature or machine body temperature), the oil temperature $\theta_2$ at the outlet of the heat exchanger 10, the oil temperature $\theta_3$ at the inlet 24 of the spindle head 41 and the oil temperature $\theta_4$ at the outlet 26 of the spindle head 41. The outputs from the four sensors $S_1$ to $S_4$ are input to a Wheatstone bridge circuit, as shown in FIG. 2.

The output $\Delta E(V)$ obtained at the detecting terminals may be expressed from the equation (well-known) used in the calculation for the bridge circuit as follows:

$$\Delta E = [[\{R + R_0(1 + \epsilon\theta_2)\} \cdot \{R_4 + R_0(1 + \epsilon\theta_4)\} - \quad (4)$$
$$\{(R + R_0(1 + \epsilon\theta_3)\} \cdot \{R_1 + R_0(1 + \epsilon\theta_1)\}]/$$
$$[\{R_1 + R_0(1 + \epsilon\theta_1) + R + R_0(1 + \epsilon\theta_2)\} \cdot$$
$$\{R_4 + R_0(1 + \epsilon\theta_4) + R + R_0(1 + \epsilon\theta_3)\}]] \cdot E_0$$

wherein R: the resistance ($\Omega$) of the fixed resistance; $R_1$: the resistance ($\Omega$) of a potentiometer VR1 connected to the sensor $S_1$ for detecting the reference temperature; $R_4$: the resistance ($\Omega$) of a potentiometer VR2 connected to the sensor $S_4$ for detecting the fluid temperature at the outlet of the machine tool; $\theta_1$ the temperature (°C.) detected by the sensor $S_1$; $\theta_2$ the temperature (°C.) detected by the sensor $S_2$; $\theta_3$ the temperature (°C.) detected by the sensor $S_3$; $\theta_4$ the temperature (°C.) detected by the sensor $S_4$; and $\epsilon$: the temperature coefficient (1/°C.) of the sensor resistance.

The main purpose of this control is to control the machine tool outlet temperature $\theta_4$ with a temperature difference between the reference temperature $\theta_1$ and the machine tool outlet temperature $\theta_4$ being taken as a set point; however, $\theta_2$ is also an object of control until the condition of $\theta_2 = \theta_3$ is reached. In this case, as will be understood from the equation (4), since both $\theta_2$ and $\theta_4$ are contained in the first term of the numerator in the equation (4), an increase in $\theta_2$ results in an increase in $\Delta E$ and an increase in $\theta_4$ also results in an increase in $\Delta E$. Accordingly, one single operation enables two different kinds of temperature to be controlled without any contradiction.

Since both the sensors $S_2$ and $S_3$ are disposed between the heat exchanger and the inlet of the machine tool and the time constant of the sensor $S_2$ is smaller than that of the sensor $S_3$, if the heat load or the reference temperature changes, the output $\Delta E$ is such as that expressed by the equation (4), but after a certain period of time has passed, the condition of $\theta_2 = \theta_3$ is reached. If the numerator and denominator of the equation (4) are divided by $[R + R_0(1 + \epsilon\theta_2)]$, the terms in the numerator of the equation (4) are as follows:

The numerator of the equation
$$(4) = R_4 - R_1 + R_0\epsilon(\theta_4 - \theta_1) \quad (5)$$

Since a PID temperature control unit 32 operates so that $\Delta E$ is 0, control is effected so that the following condition is reached:

$$R_4 - R_1 + R_0\epsilon(\theta_4 - \theta_1) = 0$$

i.e., $$\theta_4 = \theta_1 + (R_1 - R_4)/(\epsilon R_0)$$

Thus, $\theta_4$ constantly follows up $\theta_1$ with an equal temperature difference.

An input processing unit 31 as shown in FIG. 2 takes in as input signals the values that are respectively obtained in the sensors $S_1$ to $S_4$ by converting temperatures into electric signals as described above, and the input processing unit 31 electrically processes these four signals and outputs a deviation signal representing the difference between a set point and a controlled variable. The voltage output $\Delta E$ representing the deviation is in the form of an analog voltage, and after the noise component is removed in a CR filter 52, it is amplified by a DC amplifier unit 53 to an input level for control in the PID temperature control unit 32. The PID temperature control unit 32 performs a proportional plus integral plus derivative (PID) action so that the amplified deviation input signal becomes 0 (zero), as described above. Since this PID action is the action of a well-known control circuit which performs a control action by which the system is stabilized most promptly when there is a disturbance or a change in the set point, the circuit and the action thereof are not disclosed herein.

The output of the PID temperature control unit 32 is input to a control output control unit 33. The control output control unit 33 is an output amplifier circuit which amplifies the output of the PID temperature control unit 32 to a signal level with which the solenoid-operated expansion valve 15 can be actuated and then delivers an output in the form of an output voltage or an output current.

Operation of the Temperature Control Apparatus

The temperature control action according to the present invention will next be explained with reference to FIGS. 1 and 2. It is assumed that, in FIG. 1, the quantity of heat generated at the spindle head 41 increases and consequently the heat load with respect to the heat transfer oil increases. The rise in the oil temperature as a result of an increase in the heat load is immediately detected by the sensor $S_4$ and a cool operation is initiated. More specifically, the amount of fluorocarbon flowing through the heat exchanger is increased to lower the oil temperature. By virtue of the four-sensor system of the present invention, the lowering in the oil temperature is detected by the sensor $S_2$ at the output of the heat exchanger 10 to make a correction without delay; therefore, the transient deviation is minimized and hence the settling time is shortened. Since in the prior art system the lowering in the oil temperature caused by the cooling operation is detected only by the sensor $S_4$ to make a correction, there is a time delay and therefore an overshoot of temperature, that is, the transient deviation, increases.

If there is no difference in the time constant between the sensors $S_2$ and $S_3$, then $\theta_2 = \theta_3$, and since neither $\theta_2$ nor $\theta_3$ is contained in the numerator, as will be understood from the above-described equation (5), the sensors $S_2$ and $S_3$ are merely two equal fixed resistances, and any temperature change in $\theta_2$ will not participate in the control. In other words, it is impossible to make a correction without delay. The condition of $\theta_2=\theta_3$ is reached in a short period of time after the starting of the control action, and at this time, $\theta_4$ becomes stabilized with a predetermined temperature difference kept between the same and $\theta_1$, as shown by the equation (6). More specifically, since the spindle head outlet temperature $\theta_4$ is controlled with a predetermined temperature difference being constantly kept between the same and $\theta_1$, the steady-state deviation of the machine body is small.

The same consideration as in the above case where the heat load increases also applies to the case where the heat load decreases. Specifically, a lowering in the oil temperature due to a decrease in the heat load is immediately detected by the sensor $S_4$ and consequently the cooling capacity of the heat exchanger 10 is reduced, and a rise in temperature as a result of this is immediately detected by the sensor $S_2$ to make a correction.

If the reference temperature $\theta_1$ rises with the heat load being constant, this means that the set temperature for the spindle head outlet is raised, and the output of the Wheatstone bridge 51 increases to the negative side. Thus, the control action works in the direction in which the cooling capacity is reduced. In this case also, a correction is made without delay by means of the sensor $S_2$.

If the reference temperature lowers with the heat load being constant, this means that the set temperature for the spindle head outlet is lowered, and the output of the Wheatstone bridge 51 increases to the positive side. Thus, the control action works in the direction in which the cooling capacity is increased. In this case also, a correction is made without delay by means of the sensor $S_2$.

Other Embodiments

Although the foregoing embodiment employs four sensors, the output of the sensor $S_3$ among the sensors eventually coincides with the output value of the sensor $S_2$ after a certain period of time has passed. Accordingly, it is not always necessary to provide the sensor $S_3$, provided that a substitute means, for example, a compensating circuit, which performs the same function as that of the sensor $S_3$ is employed. More specifically, it is possible to employ a method wherein a value which changes with time in accordance with the output value of the sensor $S_2$ is artificially produced by a microcomputer according to software or by a compensating circuit as being a hardware means to thereby effect a control action in the same way as in the case of the above-described operating principle.

This method also makes it possible to obtain advantageous effects similar to those in the foregoing embodiment. The method enables the time constant of the sensor to be readily varied in accordance with the characteristics and heating capacity of the machine tool. In addition, although in the foregoing embodiment oil is employed as a heat transfer fluid, other substitutes, for example, a cutting fluid, water, gas, etc., may also be employed according to the application. As to the temperature controller also, although the foregoing embodiment employs a PID controller, it is also possible to employ a multi-position ON-OFF action temperature controller which enables multi-stage setting, that is, which is capable of stepwise control of the flow rate of a cooling medium.

Although in the foregoing embodiment a solenoid-operated expansion valve is employed as an actuator which varies the flow rate of the cooling medium, it is also possible to employ a solenoid-operated evaporation pressure control valve which controls the flow rate of the low-pressure refrigerant gas at the outlet of the evaporator on the basis of a differential pressure. It is also possible to employ a method wherein the number of revolutions of the refrigerating machine is controlled by use of an inverter. Although the embodiment employs cooling as a control action, heating may also be employed as a control action. Although the above-described temperature controller section 3 is of analog type, it may be a control apparatus which processes signals in a digital manner. For example, it is possible to employ a method wherein duty control is effected using the period of time during which the solenoid-operated expansion valve 15 is open.

Although the foregoing embodiment employs a Wheatstone bridge circuit, other types of known circuit may be employed, for example, a bridged-T circuit, which is a circuit performing the same function as that of the Wheatstone bridge circuit.

In addition, changes and modifications may be imparted as desired to the arrangements of the details and the conditions without departing from the spirit of the present invention.

Experimental Example

Figure 3:
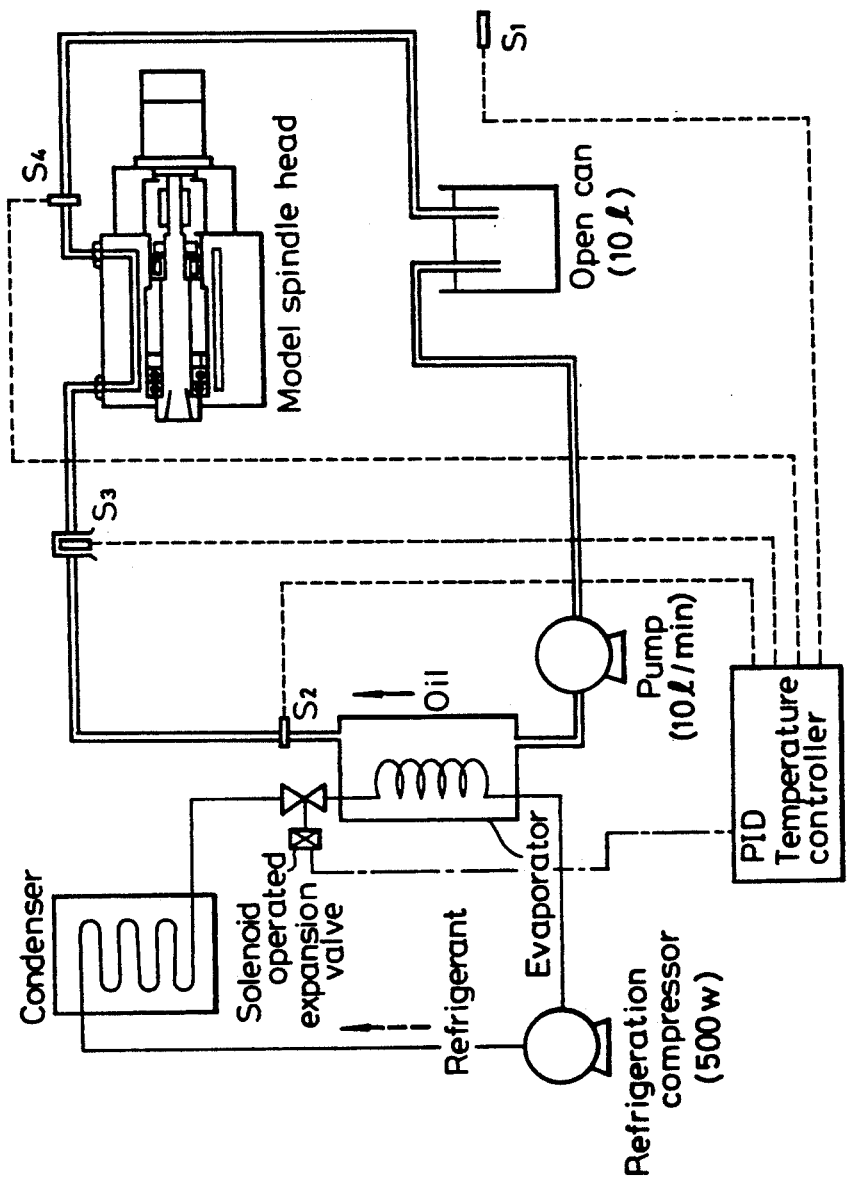
FIG. 3 is a system diagram showing the flow path of an experimental apparatus in an experimental example.

In the following experimental example, a model spindle head which is closer to an actual one is employed as a load. FIG. 3 shows an experimental machine. The specifications of the experimental machine and the experimental conditions are as follows:
(1) Controlled system: model spindle head
    weight: 65 kgf
    spindle diameter: 50 mm$\phi$
    bearings: front 7010CDBB (JIS) rear NU209 (JIS)
(2) Number of revolutions: 8000 rpm
(3) Cooling oil: Kantone 16, 10 l/min (trade name, available from KANTO SEIKI Co., Ltd.)
(4) Refrigeration compressor output: 500 w
    cooling capacity 820 kcal/h
(5) Room temperature: 22° to 25° C.
(6) Control method:
    (a) Prior art method (I): two-position control detecting oil temperature at outlet of spindle head
    (b) Prior art method (II): PID control detecting oil temperature at outlet of heat exchanger
    (c) Method of this invention: PID control employing four sensors The experimental results are shown in Table 1.

TABLE 1

| | Experimental Results | | |
|---|---|---|---|
| Control method | Transient deviation $\sigma$(°C.) | Steady-state deviation of oil temperature $\Delta\theta_0$ (°C.) | Steady-state deviation of machine body $\Delta\theta_w$ (°C.) |
| Prior art (I) | 1.24 | −0.05 | 0.15 |
| Prior art (II) | 0.3 | 0 | 2.3 |
| This invention | 0.3 | 0 | 0.1 |

In this control, 0.5(°C.) or less is targeted for all the three deviations, that is, the transient deviation, the steady-state deviation of the oil temperature and the steady-state deviation of the machine body. As will be understood from Table 1, in the two-position control by the prior art method (I), although the steady-state deviation of the machine body is small, i.e., 0.15(°C.), the steady-state deviation of the oil temperature is −0.05(°C.) and the transient deviation $\sigma$ is large, i.e., 1.24(°C.). In the prior art method (II), the steady-state deviation of the oil temperature is 0 and the transient deviation is also small, i.e., 0.3(°C.), but the steady-state deviation of the machine body is large, i.e., 2.3(°C.). In contrast to them, in the method of the present invention, the steady-state deviation of the oil temperature is 0, the transient deviation is small, i.e., 0.3(°C.), and the steady-state deviation of the machine body is the smallest in the three, i.e., 0.1(°C.).

In other words, although the prior art methods (I) and (II) cannot attain the targets, the present invention can satisfactorily attain the targets.

Industrial Applicability

The present invention is not limited to cooling of a spindle head of a machine tool such as the machining center in the embodiment. The present invention is applicable to various kinds of machine tool and industrial machine, for example, NC (numerically controlled) lathes, (NC) grinding machines, electric discharge machines, etc. The constituent element of a machine that is subjected to cooling control is not limited to a spindle head, either, and the present invention is applicable to cooling of various portions of machine tools, for example, a driving system using a ball screw, a driving motor section, a column, a bed, etc.

What is claimed is:

1. A temperature control apparatus for a machine tool which includes a constituent element having a heat generating source, a heat transfer fluid brought into contact with the constituent element cool it, and a heat exchanger for cooling the heat transfer fluid with a cooling medium to control temperature of said heat transfer fluid connected to a heat transfer fluid outlet of said constituent element to maintain a set temperature difference between a reference temperature and said temperature of said heat transfer fluid at said outlet, wherein the improvement comprises:

a reference temperature sensor for detecting, said reference temperature;

a heat exchanger outlet temperature sensor for detecting temperature of said heat transfer fluid at an outlet of said heat exchanger;

a constituent element inlet temperature sensor for detecting temperature of said heat transfer fluid at an inlet of said constituent element;

a constituent element outlet temperature sensor for detecting temperature of said heat transfer fluid at the heat transfer fluid outlet of said constituent element;

differential temperature detecting means constituted by said reference temperature sensor, said heat exchanger outlet temperature sensor, said constituent element inlet temperature sensor and said constituent element outlet temperature sensor; and control means activated in accordance with a value of an output signal from said differential temperature detecting means to control the temperature of said heat transfer fluid;

wherein a differential temperature between said heat exchanger outlet temperature and said constituent element input temperature operates in said output signal provided to said control means such that both transient deviations of heat transfer fluid temperature and steady-state deviations of machine tool body temperature are minimized.

2. A temperature control apparatus for a machine tool according to claim 1, wherein said differential temperature detecting means is a bridge circuit having all of said temperature sensors incorporated therein, said control means being constituted by a PID circuit which performs a proportional plus integral plus derivative action.

3. A temperature control apparatus for a machine tool according to claim 2, wherein a time constant of said constituent element inlet temperature sensor is greater than a time constant of said heat exchanger outlet temperature sensor.

4. A temperature control apparatus for a machine tool according to claim 1, further comprising a damping tank in a heat transfer fluid passage between said outlet of said heat exchanger and said inlet of said constituent element.

* * * * *